United States Patent [19]

Bainard et al.

[11] 4,118,856
[45] Oct. 10, 1978

[54] BI-DIRECTIONAL HYDRODYNAMIC SHAFT SEAL METHOD

[75] Inventors: Dean R. Bainard, Clover, S.C.; Dennis N. Denton, Bessemer City, N.C.

[73] Assignee: Garlock Inc, Rochester, N.Y.

[21] Appl. No.: 528,809

[22] Filed: Dec. 2, 1974

[51] Int. Cl.² .................. B21D 39/06; B29C 17/02; F16J 15/54
[52] U.S. Cl. .................................. 29/511; 264/295; 264/320; 277/134
[58] Field of Search ............... 277/134; 264/293, 295, 264/296, 320; 29/511

[56] References Cited

U.S. PATENT DOCUMENTS

| 2,797,179 | 6/1957 | Reynolds | 264/293 X |
| 2,959,819 | 11/1960 | Potter | 264/320 X |
| 3,387,850 | 6/1968 | Mastrobattista et al. | 277/1 |
| 3,620,540 | 11/1971 | Jagger et al. | 277/134 |
| 3,620,540 | 11/1971 | Jagger | 277/134 |
| 3,857,156 | 12/1974 | Clark | 264/295 X |

OTHER PUBLICATIONS

The Journal of Teflon–Radial Lip Seals–pp. 2–4, Jan.-Feb., 19790, vol. 11, No. 1.

Primary Examiner—James B. Lowe
Attorney, Agent, or Firm—Schovee & Boston

[57] ABSTRACT

A method for producing a bi-directional hydrodynamic sealing element for a shaft seal wherein the sealing element is made from a non-elastomeric material such as polytetrafluoroethylene, and has a sealing lip and a plurality of bi-directional pumping elements on a shaft engaging surface thereof, formed as a series of non-concentric circles or other geometric figures on the non-elastomeric sealing element while it is flat. The centers of the non-concentric circles are located on the periphery of a circle concentric with the sealing lip. The flat sealing element is then formed into a conical lip type sealing element and the circular pumping elements become elliptically shaped, bi-directonal helical pumping elements.

15 Claims, 3 Drawing Figures

BI-DIRECTIONAL HYDRODYNAMIC SHAFT SEAL METHOD

BACKGROUND OF THE INVENTION

1. Field of the Invention

This invention relates to shaft seals, also known as oil seals, designed for sealing against fluid leakage along shafts, such as engine crankshafts and motor vehicle drive transmission shafts, and more particularly to shaft seals of the type having thereon bi-directional pumping elements, such as ridges or grooves, for feeding back to the sealing lip (regardless of the direction of rotation of the shaft), any oil or other fluid tending to leak past the sealing lip. 2. Description of the Prior Art It is known to seal shafts by means of shaft seals having pumping elements (helical ridges or grooves) on the shaft or sealing element surface for feeding back to the sealing lip oil or other fluid tending to leak past the sealing lip. It is also known to mold such ridges or grooves into an elastomeric sealing element using oppositely directed ridges or grooves which meet the sealing lip at a small angle for feeding back oil in either direction of shaft rotation.

It is an object of the present invention to provide a method for making a bi-directional hydrodynamic shaft seal having a sealing element made from non-elastomeric material with helical or elliptically shaped pumping elements such as ridges and grooves which meet the sealing lip at a small angle for feeding back oil or other fluid in either direction of shaft rotation.

It is a further object of the present invention to provide a method for making the pumping elements on the non-elastomeric member by forming on the non-elastomeric member, while it is in the flat state as a ring or disc, a series of pumping elements, either ridges or grooves, in the shape of non-concentric circles, and then forming at least a portion of the non-elastomeric ring or disc into a conical shape such that the circular pumping elements become helical or elliptically shaped bi-directional pumping elements.

SUMMARY OF THE PRESENT INVENTION

A shaft seal having a method for making a non-elastomeric sealing element provided with bi-directional hydrodynamic ridge or groove pumping elements thereon formed in the shape of a series of non-concentric circles formed on the non-elastomeric element while it is in a flat state, and then forming the non-elastomeric element into a conical lip-type sealing element such that the non-concentric circles become helical or elliptically shaped bi-directional pumping elements. The centers of the series of circles are preferably located equally spaced around the periphery of a circle concentric with the sealing element.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENT

Figure 1:
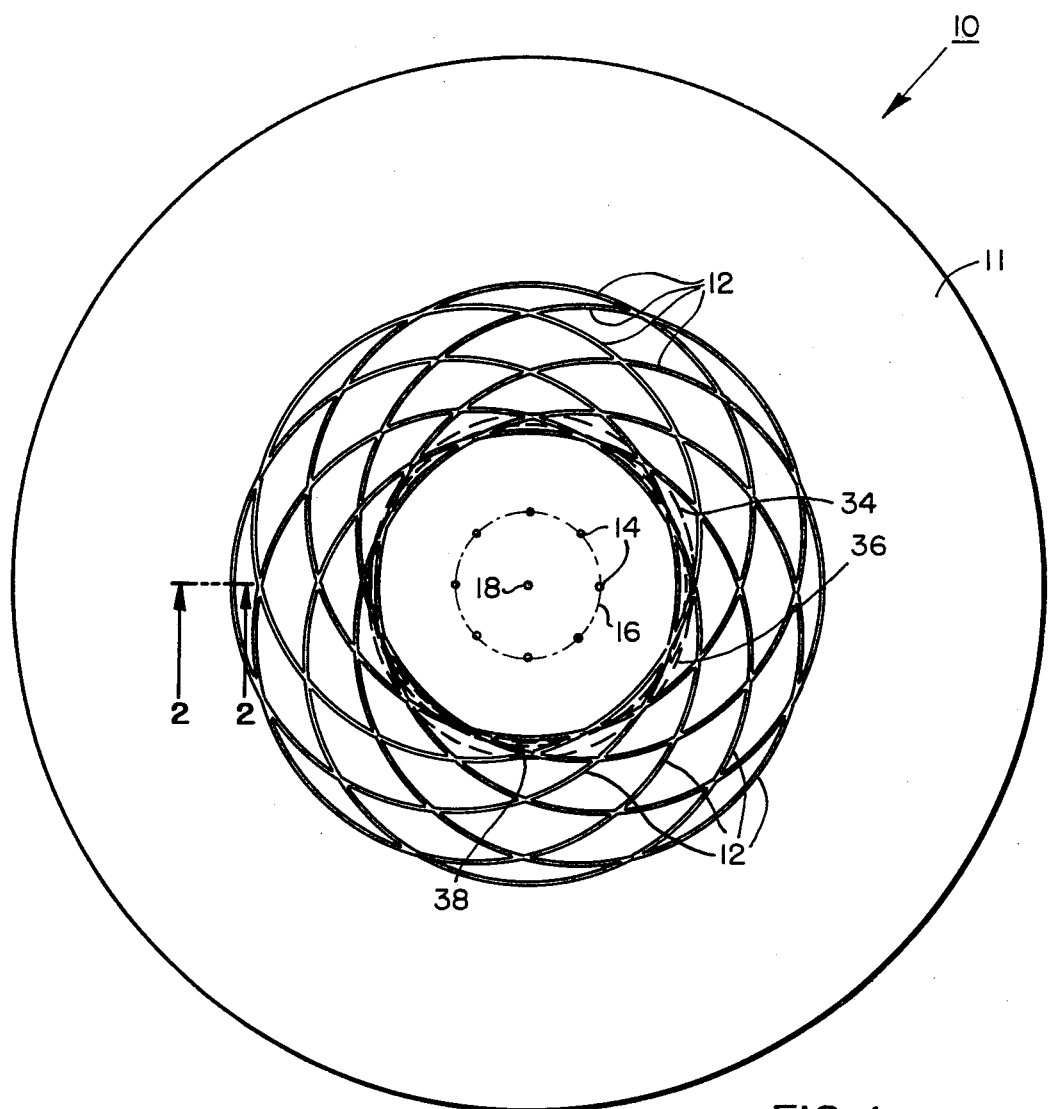
FIG. 1 is a plan view of a non-elastomeric sealing element in the shape of a flat disc having a plurality of pumping elements formed thereon in the shape of non-concentric circles.

With reference now to the drawings, FIG. 1 shows a non-elastomeric element 10, preferably of polytetrafluoroethylene, in the shape of a flat disc and having formed on a shaft engaging surface 11 thereof, by any one of a number of known molding or cold forming techniques, a series of pumping elements 12 which are circular in shape. Each of the elements 12 has a center 14 located on the periphery of a circle 16 concentric with the center 18 of the element 10 (and concentric to a sealing lip 21 described below).

Figure 2:
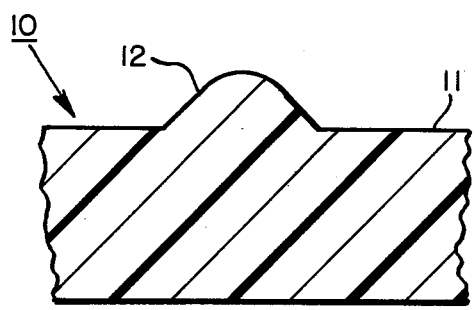
FIG. 2 is a partial cross-sectional view of the disc of FIG. 1 showing a pumping element.

FIG. 2 is a partial cross sectional view of the disc 10 of FIG. 1 along line 2—2 of FIG. 1, showing a pumping element 12. The height of the pumping elements 12 is preferably about 0.003–0.005 inch and the walls preferably form an angle of about 90° to each other as shown in FIG. 2.

Figure 3:
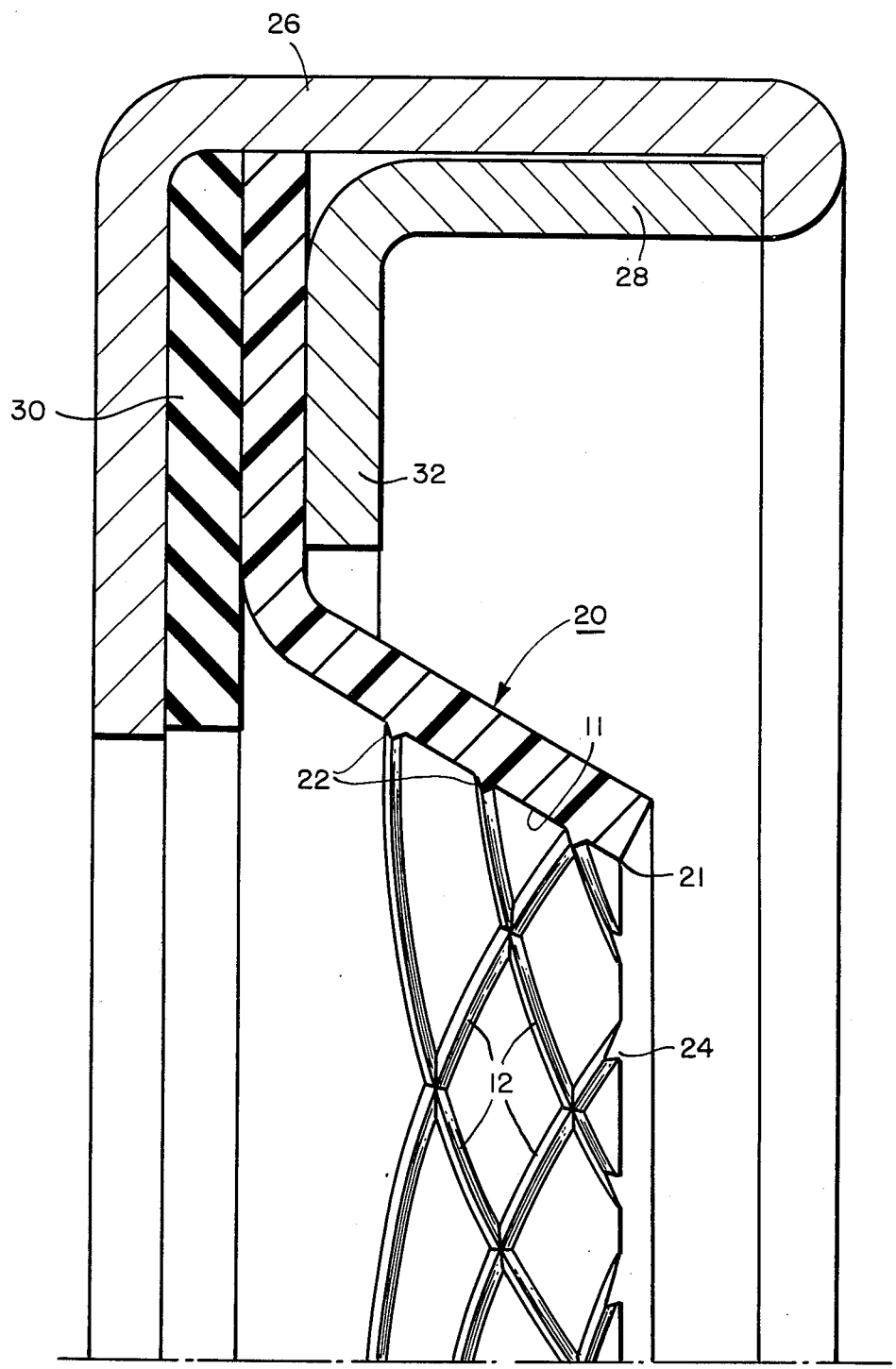
FIG. 3 is a partial cross-sectional view of a shaft seal formed according to the present invention.

Referring now to FIG. 3, after the pumping elements 12 are formed on the flat disc 10, the disc 10 is then formed (by means well-known to those skilled in the art, and which means forms no part of the present invention and are therefore not described in detail here) into a conical sealing element 20, with a sealing lip 21, such that the circular pumping elements 12 become helical or elliptical bi-directional pumping elements 22. The conical sealing element 20 has a central shaft receiving opening 24 therein, which can be formed either before or after the pumping elements 12 are formed on the flat non-elastomeric element 10. The shaft seal shown in FIG. 3 comprises an outer metal shell 26, an inner metal shell 28, a gasket 30, and the conical sealing element 20 being held in place between a radial portion 32 of the inner shell 28 and the gasket 30, by means of the outer shell 26 being rolled over and crimped onto the inner shell 28.

In a preferred embodiment, the pumping elements 12 are formed with the cross-section shown in FIG. 2 by machining grooves in a mold in the shape of circles. The circles of the pumping elements 12 are offset from the absolute center 18 of the mold and are generated off of a circle 16 that is concentric with the center of the mold. The circle 16 from which the grooves are generated can vary depending upon the desired finished product size. The two dotted lines 34 and 36 indicate two of many possibilites of offset conditions that could occur when an I.D. is cut out of the non-elastomeric element 10, and the dotted line 38 shows a perfectly cut I.D. The element 10 can be a disc as shown in FIG. 1 or can be a ring with the shaft receiving opening formed therein prior to forming the pumping elements 12 thereon, as desired. A primary advantage of this invention is the simplicity of machining circles in a mold as contrasted to coining or machining elliptically shaped pumping elements, and the fact that the resultant, continuously patterned helix design (shown in FIG. 1 for example) allows for a wide variation in I.D. cut of the shaft receiving opening 24 (both in its diameter and concentricity with respect to, for example, the seal case), without adversely affecting the hydrodynamic capabilities of the seal.

The present invention is preferably used to form bi-directional pumping elements, although uni-directional pumping elements can be formed in the same way except that instead of circles, only segments of circles are formed so that the pumping elements intersect or terminate at the annular shaft receiving opening at only one point each (the points preferably being evenly spaced-apart) and all in the same direction. In the preferred embodiment each pumping element intersects or terminates at the shaft receiving opening or sealing lip at two points, with the pumping element portion adjacent one point being a right hand pumping element and the pumping element portion adjacent the other point being a left hand pumping element. For purposes of discussion, "right hand" simply means a pumping element that will pump correctly for one direction of shaft rotation and "left hand" means a pumping element that will pump correctly for the other direction of shaft rotation.

While the preferred embodiment has been described above, it will be understood that modifications and changes can be made therein as will be evident to one skilled in the art. For example, the pumping elements 24 can be ridges or grooves, and the term "pumping element" is hereby defined for use in the present specification and claims to include both ridges and grooves. Various other materials than tetrafluoroethylene or polytetrafluoroethylene can be used. While the sealing element 10 is preferably flat during the step of forming the series of pumping elements thereon preferably in the shape of circles, it is not essential that the sealing element be flat or that the pumping elements be circular, other shapes can be used if desired. While in the preferred embodiment the sealing ring 20 with the pumping elements 22 formed thereon is connected to a shell or reinforcing element to form a seal, this is not essential, but rather the conical sealing element 20 can simply be used per se in a sealing arrangement without first being connected to any additional members. When placed on a shaft, normally between about 0.050 and 0.060 inch width of the shaft engaging surface 11 of the sealing element 20 adjacent the sealing lip 21 engages the shaft. The angle the pumping elements 22 make with the plane of the sealing lip 21 can vary as desired, however, the angle is less than about 20° and preferably less than about 5°. When the pumping elements 12 are formed on a flat non-elastomeric element 10 that is ring-shaped (with the central opening already formed therein), then the pumping elements 12 are formed in the shape of segments of circles since a portion of the circles intersects the central opening in the element 10. Thus, throughout the present specification and claims the phrase "in the shape of circles" includes this embodiment wherein the pumping elements 12 are not full circles but only segments of circles as well as the embodiment where the element 10 is a disc and the circles are full circles.

The invention has been described in detail with particular reference to the preferred embodiments thereof, but it will be understood that variations and modifications can be effected within the spirit and scope of the invention as described hereinabove and as defined in the appended claims.

We claim:

1. A method for making a sealing element having a sealing lip and having a plurality of pumping elements on a shaft contacting surface thereof for feeding back to said sealing lip any fluid leaking past said sealing lip, said method comprising forming a series of pumping elements in the shape of non-concentric circles on said surface of said element while said element is substantially flat, and then forming at least a portion of said flat element into a conical lip type seal with a sealing lip such that said pumping elements become helical or elliptically shaped pumping elements.

2. The method according to claim 1 wherein said forming step comprises simultaneously forming said nonconcentric circles.

3. The method according to claim 2 wherein said sealing element is made of non-elastomeric material.

4. The method according to claim 3 wherein said material is polytetrafluoroethylene.

5. The method according to claim 3 wherein said flat element is a disc, and said second forming step includes forming a shaft receiving opening in said disc.

6. The method according to claim 3 wherein said flat element is a ring having a circular, concentric, central circular opening therein and wherein said series forming step includes forming a series of pumping members in the shape of at least segments of non-concentric circles on said surface of said ring.

7. The method according to claim 3 wherein said series forming step comprises forming said pumping elements in the shape of non-concentric circles with the centers of the circles being located on the periphery of a circle concentric with said sealing lip.

8. The method according to claim 3 wherein said second forming step includes forming at least a portion of said flat element into a conical lip type sealing element such that said pumping elements form an angle of less than about 5° to the plane of said sealing lip.

9. The method according to claim 3 wherein said series forming step comprises forming a plurality of pumping elements in the shape of non-concentric circles, with the centers of said circles equally spaced-apart on a circle concentric with the axis of said sealing element, and with said pumping elements terminating at said sealing lip at an angle of less than about 5°.

10. The method according to claim 3 including the step of connecting said sealing element after said second forming step to an annular reinforcing element for forming a shaft seal.

11. The method according to claim 3 wherein said pumping elements are ridges.

12. The method according to claim 3 wherein said pumping elements are grooves.

13. The method according to claim 3 wherein said series forming step comprises molding.

14. The method according to claim 3 wherein said series forming step comprises cold forming.

15. The method according to claim 3 wherein said second forming step includes forming said at least a portion of said flat element into a conical lip type sealing element with a sealing lip, such that each of said circular pumping elements terminates at said sealing lip at two points, whereby the pumping element portion of one pumping element, adjacent one point, is a right hand pumping element and the pumping element portion of said one pumping element adjacent the other point is a left hand pumping element.

* * * * *

UNITED STATES PATENT AND TRADEMARK OFFICE
CERTIFICATE OF CORRECTION

PATENT NO. : 4,118,856
DATED : October 10, 1978
INVENTOR(S) : Dean R. Bainard and Dennis N. Denton It is certified that error appears in the above-identified patent and that said Letters Patent are hereby corrected as shown below:

In claim 6, line 4, after "pumping" delete "members" and substitute therefor --elements--.

Signed and Sealed this

Twentieth Day of February 1979

[SEAL]

Attest:

RUTH C. MASON
Attesting Officer

DONALD W. BANNER
Commissioner of Patents and Trademarks